US006159564A

United States Patent [19]

Korhonen

[11] Patent Number: 6,159,564

[45] Date of Patent: Dec. 12, 2000

[54] CORE AND A METHOD OF MANUFACTURING SUCH

[75] Inventor: Pertti Korhonen, Kyminlinna, Finland

[73] Assignee: Andritz-Ahlstrom OY, Helsinki, Finland

[21] Appl. No.: 09/142,636

[22] PCT Filed: Mar. 10, 1997

[86] PCT No.: PCT/FI97/00155

§ 371 Date: Sep. 10, 1998

§ 102(e) Date: Sep. 10, 1998

[87] PCT Pub. No.: WO97/33745

PCT Pub. Date: Sep. 18, 1997

[51] Int. Cl.[7] ................................ B32B 1/08; B65D 3/04; D21J 3/04; B31C 5/00

[52] U.S. Cl. .......................... 428/34.2; 156/192; 156/195

[58] Field of Search .................................... 156/187, 192, 156/195; 493/549, 386; 428/34.2, 34.3, 34.6, 36.9, 36.91

[56] References Cited

U.S. PATENT DOCUMENTS

| | | | |
|---|---|---|---|
| 5,586,963 | 12/1996 | Lennon et al. | 493/299 |
| 5,707,328 | 1/1998 | Sato et al. | 493/279 |
| 6,036,139 | 3/2000 | Ogg | 242/610.1 |

FOREIGN PATENT DOCUMENTS

| | | |
|---|---|---|
| 0534162 | 3/1993 | European Pat. Off. . |
| 0699518 | 3/1996 | European Pat. Off. . |
| 3-217839 | 9/1991 | Japan . |

*Primary Examiner*—Richard Crispino
*Assistant Examiner*—George R. Koch, III
*Attorney, Agent, or Firm*—Nixon & Vanderhye P.C.

[57] ABSTRACT

A method of manufacturing a core, especially a spiral core, from superimposed plies of board produced by winding, gluing, and drying them, is provided. The method is practiced so that the moisture content of at least some of the board plies entering the winding stage differ from each other in order to provide a stepwise moisture structure within the core wall. This decreases unfavorable stresses which are produced in the drying stage if a core is manufactured from plies having equal moisture content.

19 Claims, 1 Drawing Sheet

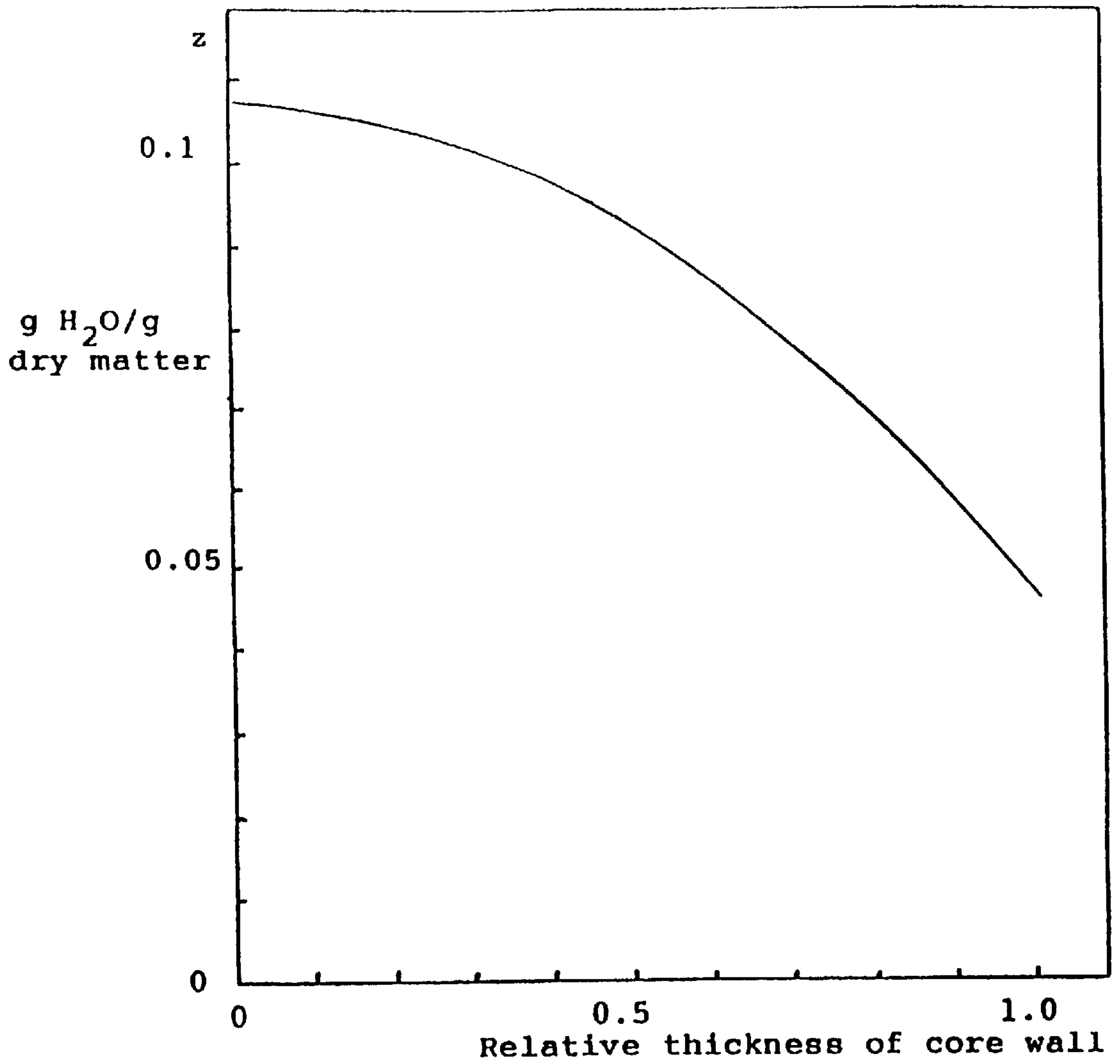
FIG.

CORE AND A METHOD OF MANUFACTURING SUCH

The present invention relates to a method of manufacturing a core, especially a spirally wound core, from superimposed plies of board by winding, glueing, and then drying such.

Webs produced in the paper, plastic and textile industries are usually reeled on cores for rolls. Cores made from board, especially spiral cores, are manufactured by glueing plies of board one on top of the other and by winding them spirally in a special spiral machine. The width, thickness, and number of plies of board needed to form a core vary depending on the dimensions and strength requirements of the core to be manufactured, the ply width being typically 50 to 250 mm, thickness 0.2 to 1.2 mm and the number of plies 3 to 30. The strength of the board ply varies to comply with the strength requirement of the core.

The wall thicknesses of cores will vary within a wide range, being typically 0.50 to 18 mm. The thicker the core wall, the more plies it is composed of. Irrespective of the ply, moisture of the board entering the spiral machine is typically the same, homogeneous, e.g. 8%, which often corresponds to the demand for moisture of the finished core.

As a great number of thin plies are glued together by spreading glue onto large surfaces thereof to make them into a thick core wall, and as the dry matter content of the glue is generally low, about 20 to 60%, the moisture of the board clearly increases at the spiral machine, usually up to 11–18%. Therefore, the produced core has to be dried until it is ready to be delivered to the user.

Drying is effected by blowing mildly heated air through a stack of cores. Drying is laborious and time consuming because the core wall to be dried is thick. A moisture gradient is inevitably formed inside the thick material during drying. In other words, the surface has to dry before the inner parts of the wall can begin to dry. Such a moisture gradient may be several percentage units of moisture per a few millimeters. This is shown, by way of example, in the accompanying graph which indicates a typical moisture profile within a core wall. It is typical of a moisture gradient of known cores that it does not readily become level once it has been formed.

When a ply of board is glued, its fibres swell. During drying of the core, the fibres shrink again as their moisture decreases. For drying, the cores are usually stacked tightly in an overlapping arrangement. Because of the mode of stacking, each core dries mainly internally when air is blown thereto. In the tight stacking, the moisture gradient is formed in one direction, i.e., z-direction, so that the moisture decreases from near the outer periphery of the core towards the inner surface the core wall (cf. FIG.).

Hence, as the core wall has differences in its moisture content and as shrinking occurs at different times during drying, and the latter has an opening effect on the core structure, relatively strong internal stresses are developed in the core wall. Stresses also result from differences in angles of board strips of various plies, according to the geometry of a spiral core. In the worst case, these stresses may even cause material defects. In any case, they weaken the strength of the core when it is under strain, the most typical of such strain being so-called chuck loading (i.e., the roll is supported by a core through relatively short chucks).

The internal stresses of the core may be detected by splitting a thin annulus cut off of the core or by testing cores that have been dried and treated in different manners with a special chuck strength testing device.

It is an object of the present invention to provide a method of decreasing, eliminating or even changing the direction of these stresses, in order to thereby increase the strength and load resistance of a core, especially in case of chuck loading.

In the method of the present invention, the core is manufactured of superimposed plies of board by winding, glueing and drying them, and it is a characteristic feature of the invention that the moisture contents of at least some of the plies entering the winding stage differ from each other in order to produce a stepwise moisture structure in the core wall.

As mentioned hereinabove, prior art board cores have been manufactured so that the plies of board used to compose the core wall have equal moisture contents. During drying of the core, the moisture gradient is so formed that the plies nearest to the inner wall (or walls) dry first, thereby developing unfavourable stresses.

When the original moisture contents of the different board plies are arranged according to the invention, for example, already during board manufacture or when slitting the board strips having different widths and intended for different plies, so that the moistures comply with the moisture gradient which is inevitably developed in the board plies during core drying, stresses described hereinabove are minimized. The stepwise moisture structure according to the invention can be produced when the shape of the moisture gradient is first received by either thermodynamical calculation or definition by tests. Required differences in moisture content (stepwise moisture structure) may be produced at a spiral machine, by changing and/or adjusting the method of glueing various board plies (e.g., one-side or two-side glueing), or by changing and/or adjusting the type of glue. Thus, at least one type of glue is used for glueing various board plies. Required differences in moisture content may be produced at the spiral machine also by changing properties, especially the dry matter content, of the type of glue used for glueing various board plies.

In prior art methods, all plies within the core wall have typically had the same moisture content of, e.g., 8%. The original moisture content of the internal plies of the core manufactured by the method according to the invention is e.g. 6%, increasing towards the outer surface of the core first to 7%, then to 8.5% and finally, on the outer surface to about 10%. Glueing increases the moisture content because of the water contained in the glue, which water is removed in drying. However, the originally provided stepwise moisture structure relationship according to the invention is maintained in every stage, whereby developing of harmful stresses in drying is avoided. The moisture values given hereinabove are exemplary, and other types of stepwise moisture structures are feasible according to each case, for example, according to the desired final moisture content of a finished core. Furthermore and for example, the outermost ply may be left drier in order to expedite the drying process itself, or drier plies may be arranged on both surfaces of the core wall in accordance with the moisture gradient anticipated on the basis of the mode of drying.

The chuck load resistance of the core manufactured by the method according to the invention is even 50% higher in comparison with cores manufactured according to prior art when under unfavourable stress. This is indicated by the table below, presenting the chuck load resistance values of cores manufactured according to prior art and correspondingly, according to the present invention.

| Core | Chuck load resistance kN/100 mm (1) | |
|---|---|---|
| | Comparison value (2) | Stepwise moisture |
| Printing paper core | 0.70 | 0.95 |
| Rotogravure paper core | 1.80 | 2.30 |
| Rotogravure paper core | 2.40 | 3.20 |

(1) defined with Ahlstrom Core Tester (EP patent 309123), test core length 100 mm, power acceleration to maximum 180 s
(2) long term statistic average of said core grade The method of the invention also allows use thereof by manufacturing a pretensioned core in such a way that a tension status opposite to the direction of tensions developing under chuck loading is produced in the core, thereby increasing the core strength. This is accomplished, e.g., by letting the core moisture increase after drying.

The invention is not limited to the exemplary embodiments described hereinabove, but various modifications and applications are possible within the inventive scope defined by the accompanying claims.

What is claimed is:

1. A method of manufacturing a core having a center portion and an outer surface from superimposed plies of board, comprising:

(a) gluing the plies in a gluing stage; then (b) feeding a plurality of plies of board to a winding stage, at least some of the plies entering the winding stage having a moisture content differing from each other; and then (c) drying the plies in a drying stage; and wherein (a)-(c) are practiced to provide a stepwise moisture content of the plies increasing from the center portion to the outer surface of the core.

2. A method as recited in claim 1 wherein (a) and (b) are practiced to provide a core having a center portion ply with about 6% moisture content, a next ply with about 7% moisture content, a next ply with about 8.5% moisture content, and an outer surface with a moisture content of about 10%.

3. A method as recited in claim 1 further comprising (d) increasing the core moisture after (c) to provide a tension effect stretching the core.

4. A method as recited in claim 1 wherein (a) and (b) are practiced by using board machine during board manufacture or subsequent slitting to produce board strips of different thicknesses to provide the boards of different moisture content.

5. A method as recited in claim 1 wherein (a) and (b) are practiced using a spiral machine and effecting different moisture content in the plies by at least one of changing and adjusting the method of gluing various board plies.

6. A method as recited in claim 5 wherein (a) and (b) are further practiced by one-side or two-side gluing.

7. A method as recited in claim 6 wherein (a) and (b) are practiced using a spiral machine and effecting different moisture content of the plies by using at least one particular type of glue in (a).

8. A method as recited in claim 6 wherein (a) and (b) are practiced using a spiral machine and effecting different moisture content of the plies by varying the particular type of glue in (a).

9. A method as recited in claim 6 wherein (a) and (b) are practiced using a spiral machine and effecting different moisture content of the plies by changing the dry matter content of the glue in (a).

10. A method as recited in claim 5 wherein (a) and (b) are practiced using a spiral machine and effecting different moisture content of the plies by varying the particular type of glue in (a).

11. A method as recited in claim 5 wherein (a) and (b) are practiced using a spiral machine and effecting different moisture content of the plies by changing the dry matter content of the glue in (a).

12. A method as recited in claim 1 wherein (a) and (b) are practiced using a spiral machine and effecting different moisture content of the plies by using at least one particular type of glue in (a).

13. A method as recited in claim 1 wherein (a) and (b) are practiced using a spiral machine and effecting different moisture content of the plies by varying the particular type of glue in (a).

14. A method as recited in claim 1 wherein (a) and (b) are practiced using a spiral machine and effecting different moisture content of the plies by changing the dry matter content of the glue in (a).

15. A method as recited in claim 1 wherein (a)-(c) are further practiced to reduce undesirable stresses during the drying stage compared to a core manufactured from plies having substantially the same moisture content in (b).

16. A core produced from the method of claim 15 and having reduced undesirable stresses during the drying stage compared to a core manufactured from plies having substantially the same moisture content in (b).

17. A spiral core comprising a plurality of superimposed plies of board at least some of which have a moisture content differing from others of the plies.

18. A spiral core as recited in claim 17 wherein said core has a center portion ply with about 6% moisture content, a next ply with about 7% moisture content, a next ply with about 8.5% moisture content, and an outer surface with a moisture content of about 10%.

19. A spiral core as recited in claim 18 wherein said plies are glued together.

* * * * *

UNITED STATES PATENT AND TRADEMARK OFFICE

CERTIFICATE OF CORRECTION

PATENT NO. : 6,159,564
DATED : December 12, 2000
INVENTOR(S) : Pertti Korhonen

It is certified that error appears in the above-identified patent and that said Letters Patent is hereby corrected as shown below:

Title Page, Item No. 73 [Assignee], change Andritz-Ahlstrom Y, Helsinki, Finland to: - Ahlström Alcore Oy, P.O. Box 5, FIN-00441 Helsinski, Finland -

Signed and Sealed this

Eighth Day of May, 2001

*Attest:*

Nicholas P. Godici

NICHOLAS P. GODICI

*Attesting Officer*

*Acting Director of the United States Patent and Trademark Office*